Jan. 21, 1958
J. P. WARNER
2,820,705
METHOD OF RECOVERING METALS FROM NON-FERROUS
METALLURGICAL SLAGS
Filed March 17, 1955
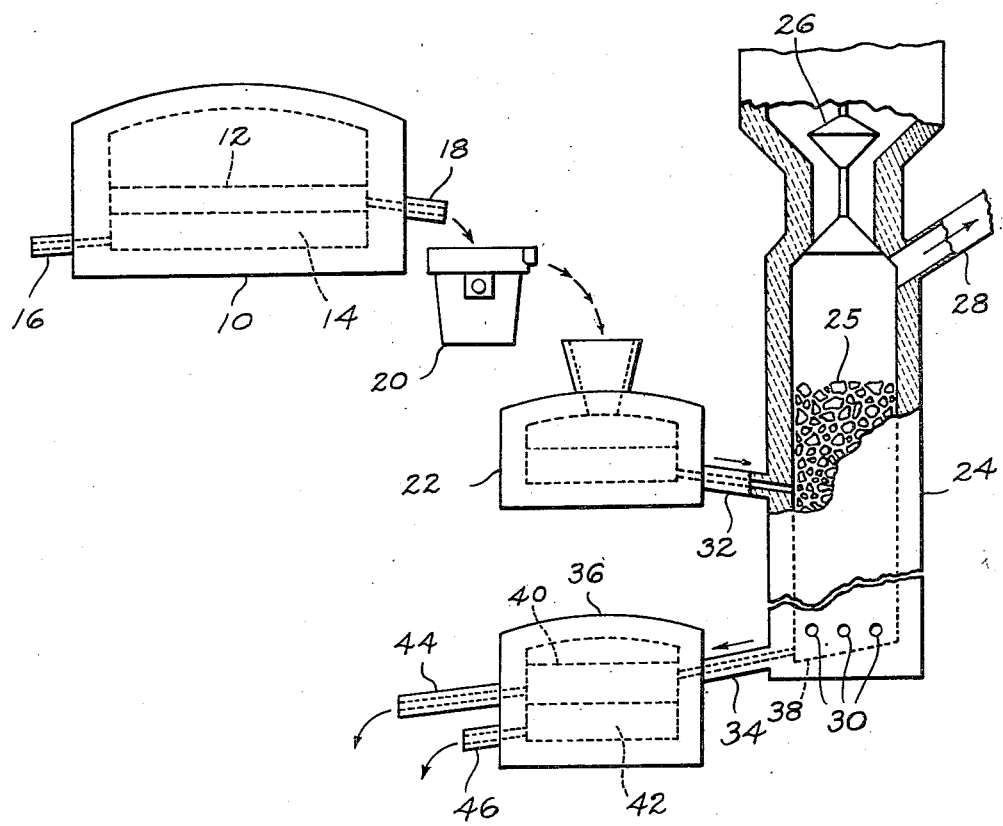
INVENTOR.
John P. Warner
BY
Clinton L. Mathes
Atty.

United States Patent Office 2,820,705
Patented Jan. 21, 1958

2,820,705

METHOD OF RECOVERING METALS FROM NON-FERROUS METALLURGICAL SLAGS

John P. Warner, Vancouver, British Columbia, Canada

Application March 17, 1955, Serial No. 494,912

16 Claims. (Cl. 75—24)

This invention relates to a process for recovering metals from non-ferrous metallurgical slags.

Many pyrometallurgical operations involving non-ferrous metal ores, i. e. ores which are processed or smelted for the primary purpose of recovering metals other than iron, produce slags which are discarded as waste materials even though they have an appreciable content of valuable metals. These slags comprise principally the oxides of silicon, aluminum, magnesium, calcium, and iron, together with minor proportions of the oxides and sulfides of copper, nickel, cobalt, zinc, tin, lead, etc.

For example, the slag obtained from the reverberatory smelting and converting of copper-nickel sulfide ores contains up to 1% of each metal, together with as much as 1% of cobalt. Similarly, the slag obtained by the smelting of copper ores may contain 1% each of copper and cobalt, and the slags produced by the blast furnace smelting of lead-zinc ores contain appreciable amounts of both lead and zinc.

Under the usual commercial practices for smelting the foregoing and other ores, these valuable metals are lost when the slag is discarded, for no practical, economical method has been developed for their recovery. Principal reasons for this are the difficulty inherent in recovering them unalloyed with iron, which often is also present in considerable proportions in the slag, and the difficulty encountered in contacting a melted slag with a reducing agent for converting its metallic content to the corresponding free metals.

Accordingly, it is the general object of this invention to provide a process for recovering metals from non-ferrous metallurgical slags.

It is another object of this invention to provide a process for the recovery of metals from non-ferrous metallurgical slags which is widely applicable to slags derived from a diversity of smelting operations and containing a large number of different metals.

It is another object of this invention to provide a process for the recovery of metals from non-ferrous metallurgical slags which is highly efficient, recovering as much as 90% of the valuable metal content of the slag.

It is another object of this invention to provide a process for the recovery of metals from non-ferrous metallurgical slags which is efficient in recovering the non-ferrous metal content of the slag substantially free of contamination with iron.

It is another object of this invention to provide a process for the recovery of metals from non-ferrous metallurgical slags which is exceedingly rapid, requiring but a few seconds time.

It is another object of this invention to provide a process for the recovery of metals from non-ferrous metallurgical slags which may be operated in conjunction with conventional smelting equipment, without extensive modification of the latter.

It is another object of this invention to provide a process for the recovery of metals from non-ferrous metallurgical slags which is effective in separating the valuable metal content of the slag economically at low cost.

The manner in which the above and other objects of this invention are accomplished will be apparent from the accompanying specification and claims, considered together with the drawing comprising a schematic flow plant illustrating apparatus which may be employed in effectuating the presently described process.

Generally stated, the present process for recovering metals from non-ferrous metallurgical slags containing reducible compounds of the metals comprises establishing a reduction zone in a furnace containing a matrix comprising pieces of carbon or other reducing materials for the reducible compounds. This zone is maintained at a temperature of, broadly, between the melting point of the slag and 1450° C. Also, an atmosphere of carbon monoxide and carbon dioxide is established in such proportions that log. $CO/CO_2$ is, broadly, from —4 to +2.

The molten slag is contacted with the reducing material in the reduction zone by percolating it downwardly therethrough or otherwise. This requires but a few seconds. However, during this short time, under the conditions present in the reduction zone, the reducible compounds of the valuable metals it is sought to recover are converted to the free metals, while the iron content of the slag is substantialy unaffected.

Accordingly, there is produced a treated slag product which contains the valuable metals in the reduced or free state. The treated slag containing these metals then is withdrawn from the reduction zone substantially immediately, to prevent reduction of any iron compounds which might be present, and concomitant contamination of the desired metal products thereby. It then may be processed for separation of the metal fraction from the residual slag.

Considering the foregoing in further detail and with particular reference to the drawing:

The presently described process is applicable in general to the recovery of volatile metals and to those metals which are less active than ferrous iron in the electromotive series. It thus is applicable to the recovery of such volatile metals as zinc, as well as to the recovery of other metals including cobalt, nickel, lead, tin, copper, silver and gold.

The process accordingly may be applied to slags derived from the smelting of such ores as pentlandite, a double sulfide of nickel and iron ($NiFeS_2$); carrollite, a double sulfide of coper and cobalt ($CuCo_2S_4$); chalcocite, copper sulfide ($Cu_2S$); galena ($PbS$); sphalerite ($ZnS$); cassiterite ($SnO_2$); and the like.

These and other non-ferrous metal ores may be smelted in a furnace indicated schematically at 10 in the drawings. This results in the production of an upper slag layer 12 and a lower layer 14 of molten metal. The latter may be withdrawn through port 16 and refined for metal recovery in the usual manner.

The slag layer, however, is withdrawn from port 18 and discharged into ladle 20. It then is transferred to the slag storage vessel 22 until such time as it is charged into the reduction furnace.

The latter comprises a tower 24 which may be from 20 to 30 feet in height, and 5 to 8 feet in diameter, lined with a suitable refractory material, and packed with a reducing matrix 25. At its top is a charging bell 26 and a gas off-take 28. External heating means, not illustrated, may be incorporated, if desired. Tuyeres 30 are provided at the lower portion of the tower for introducing air as required to heat the tower and complete the reactions occurring therein while maintaining a stipulated CO/CO₂ ratio range.

A conduit 32 interconnects the slag storage chamber 22 and the interior of the tower at a point suitably selected in the top portion of the latter. Another conduit 34 is provided at the bottom of the tower interconnecting the same and the settler 36.

It is to be noted that means are provided for transferring any liquid content which may reach the bottom of reduction tower 24 to settler 36 substantially as soon as it reaches the bottom of the tower. In the illustrated embodiment such means comprise a sloping floor 38 which, in combination with conduit 34 immediately withdraws the liquid slag from the bottom of the tower and transfers it to the settler.

In the settler the treated slag separates into two layers, i. e. an upper or slag layer 40 and a lower or recovered metal layer 42. The former may be withdrawn from the settler via port 44 and the latter via port 46.

Within tower 24 a reduction zone is established, preferably by packing the tower with a matrix comprising pieces of carbon. The carbon employed preferably comprises active carbon such as petroleum coke, gas retort carbon, electrode carbon, graphite, etc. in the form of pieces having diameters of between ½ and 1½ inches. This carbon serves the dual functions of reducing the metal content of the slag and of supplying heat to the interior of the furnace, since a part of it is consumed during the reactions occurring therein.

Since carbon pieces are not readily wettable by certain molten slags, there may be a tendency for the slag to run rapidly through the tower, quicksilver fashion, without affording a dwelling time sufficient to accomplish the desired reaction. This difficulty may be overcome by the inclusion in the carbon matrix of an effective proportion of a slag-wettable refractory oxide, which is not reducible under the conditions of reaction present in the tower.

Such refractory oxides comprise broadly the slag-wettable siliceous compounds, illustrative of which are the siliceous gangues and ores, fire brick, ganister ores, silica brick, sand aggregates and the like, reduced to a particle size of for example between ½ to 1½ inches.

Conditions within the tower are regulated so as to provide an atmosphere of carbon monoxide and carbon dioxide in such proportions that their relative concentrations may be expressed by the relationship logarithm $$CO/CO_2 = -4 \text{ to } +2$$

preferably, $-2$ to $+1$. This is one factor which assists in regulating the reaction so that it results in the selective reduction of the valuable metals present in the slag to the substantial exclusion of the reduction of any iron compounds which may be present.

If the ratio of carbon monoxide to carbon dioxide is higher than the indicated level, the iron and to some extent the silicon compounds are reduced, introducing undesirable contaminants in the product. However, if the ratio is too low, the valuable metal compounds which it is desired to reduce are not thus reduced in a reasonable reaction time.

Control of the carbon monoxide-carbon dioxide ratio may be achieved in any one of several ways. It may be effectuated, for example, by varying the temperature within the tower, accelerating or decelerating the rate of slag flow therethrough, reducing or increasing the height of the column, or of the carbonaceous packing, or reducing or increasing the particle size of the packing. Also, the character of the carbon employed to pack the tower may be varied. If it is too active, it may be diluted with carbon of a less active type. For example, petroleum coke, which is a highly active reducing agent for the present purposes, may be diluted with metallurgical coke, which is less active in this respect.

The temperature within the tower, like the reducing atmosphere therein, is controlled within carefully defined limits. In general, a temperature is maintained, either by the application of external heat, by internal electric resistance heating, and/or by blowing air into the packed tower for combustion of part of the carbon which it contains, at a level which is at least sufficient to maintain the slag introduced into the tower in a molten condition, and to keep molten any metals which may be liberated by the ensuing reactions.

On the other hand, the temperature must be restricted to not over 1450° C., since if this critical upper temperature limit is exceeded, reduction of some or all of the iron and silicon content of the slag may occur, so that the product is contaminated with these elements. A preferred temperature range to be established in the tower is between 1100 and 1400° C. Within this range, slags produced from the smelting of the various non-ferrous ores are processed with particular efficiency. When processing slags containing cobalt, copper, lead, nickel and tin, the preferred conditions of carbon monoxide to carbon dioxide ratio and of temperature set forth in Table I are used to particular advantage.

TABLE I

| Metal | Range log. CO/CO₂ | Temperature Range, ° C. |
|---|---|---|
| Cobalt | $-1.0$ to $+1.7$ | 1,100 to 1,400 |
| Copper | $-3.3$ to $-1$ | 1,100 to 1,400 |
| Lead | $-3.3$ to $-1$ | 1,050 to 1,350 |
| Nickel | $-2.3$ to $0$ | 1,100 to 1,400 |
| Tin | $-1.0$ to $+1.7$ | 1,100 to 1,400 |

Accordingly it will be seen that it is desirable to maintain the temperature within the tower as low as possible while still maintaining the slag and reduction products in a molten, fluid condition. If it should be desired to apply the process to a slag which is particularly high melting, it may be necessary to reduce its melting point prior to introducing it into the tower. This may be accomplished by mixing it with suitable proportions, i. e. from a trace up to 20% by weight, of a fluxing material such as lime, sodium, carbonate, fluorspar and the like.

*Operation*

The manner of executing the presently described process for the recovery of valuable metals from non-ferrous metallurgical slags is as follows:

The slag layer 12 is withdrawn from a conventional smelting furnace 10, via port 18, into transfer ladle 20. It then is transferred into storage vessel 22 and charged therefrom continuously at the selected rate into tower 24.

The latter tower is packed with carbon pieces mixed, if desired, with pieces of a slag-wettable packing material such as pieces of bricks for the purpose of slowing down the passage of the slag through the tower. The packing material may be introduced into the tower, as required, through charging bell 26.

Within the tower a broad carbon monoxide-carbon dioxide ratio of log. CO/CO₂=—4 to +2 is maintained by controlled combustion of the carbon packing, as by regulating the amount and temperature of air introduced thereinto through tuyeres 30.

Also, while maintaining the above CO/CO₂ ratio, the temperature within the tower is controlled within the broad limits of between the melting point of the slag and 1450° C. by the controlled combustion of the carbon, as well as by the application of additional heat externally by means of a heated jacket or internally by electric resistance heating.

The molten slag introduced into tower 24 via charging port 32 percolates downwardly through the tower at a rate determined by the particle size of the packing, the amount of slag-wettable material contained therein, the dimensions of the tower, the temperature, etc. However, because of the carefully controlled conditions within the tower, a selective reduction of the compounds of those metals which are volatile, or are below ferrous iron in the electromotive series is obtained in a matter of a few seconds. As a result there is formed a treated slag comprising the molten, liberated metals, containing in some cases a proportion of the sulfides of the said metals, and a residual slag which contains most, if not all of the iron and silicon originally present.

The treated slag is not permitted to accumulate on the bottom of the floor of tower 24, but, because of the slanting floor 38 thereof, is discharged as soon as it reaches the bottom through discharge port 34. This further prevents reduction of the iron and silicon. Any gases which are formed, including the vapor of volatile metal products such as zinc, escape through the gas take-off 28 at the top of the tower and are collected or discharged to atmosphere, as desired.

The treated slag mixture withdrawn from the tower is collected in setler or forehearth 36. The slag layer on top then may be withdrawn through the discharge port 44, while the metal layer, comprising an alloy of the recovered metals, is withdrawn from discharge port 46. The slag layer may be discarded or recycled through tower 24 for further processing, if desired. The metal layer may be transferred to subsequent operations for refining and recovery of its constituent metals.

As a further variant to the procedure described herein, all or part of the treated slag mixture withdrawn from the tower via discharge port 34 may be used to treat further quantities of slag outside tower 24. These quantities thus would bypass the tower, but would be reduced by contact with the highly reduced slag and alloy in a suitable chamber, for example in the tower settler or forehearth. Thus, by varying the proportion of slag poured through the tower and the proportion bypassing this tower, a very effective control of slag and metal alloy composition is available.

The process of the invention is illustrated by the following examples, wherein percentages are expressed as percentages by weight.

EXAMPLE 1

A slag containing copper, nickel and cobalt and resulting from the smelting of a nickel-copper sulfide ore was percolated through a tower packed with pieces of petroleum coke. The interior of the tower was heated by electric resistance heating with high frequency current to a temperature of 1350° C. A carbon monoxide to carbon dioxide arithmetical ratio of .5:1 was maintained within the tower.

After passing through the tower, the slag was withdrawn immediately and its reduced metal content separated from the residual slag fraction. Both the metal fraction and the slag fraction were analyzed, the results being given in Table II below.

TABLE II

| Test No. | Initial slag compn. (Percent) | | | Final slag compn. (Percent) | | | Percent Metal Recovered | | |
|---|---|---|---|---|---|---|---|---|---|
| | Cu | Ni | Co | Cu | Ni | Co | Cu | Ni | Co |
| 1 | .12 | .11 | .10 | .062 | .044 | .026 | 48.4 | 60.0 | 74 |
| 2 | .12 | .11 | .10 | .034 | .028 | .020 | 71.7 | 74.6 | 80 |
| 3 | .12 | .11 | .10 | .050 | .032 | .048 | 58.4 | 70.9 | 52 |

EXAMPLE 2

The procedure of Example 1 was repeated using a sample of slag containing copper, nickel and cobalt derived from the smelting of another nickel-copper sulfide ore. The original analysis of the slag was Cu .485%, Ni .59% and Co .276%. After treatment in the tower its final content of the free metals was Cu 0.162%, Ni 0.030%, and Co 0.038%. The metal recovery accordingly was as follows, in percent by weight: Cu 66.6%, Ni 94.9%, and Co 70.0%.

Thus, it will be apparent that by the present invention I have provided a process and apparatus for the efficient recovery of valuable metals from non-ferrous metallurgical slags. The process is applicable to a wide diversity of slags containing a diversity of metals. It is rapid and efficient, recovering in the order of 90% of the valuable metal content of the slags to which it is applied. This may be accomplished furthermore by a process and apparatus which may be incorporated readily into the conventional smelting procedure and plant, without extensive modification of either.

Having now described my invention in preferred embodiments, I claim as new and desire to protect by Letters Patent:

1. A process for recovering metals less active than ferrous iron in the electromotive series from non-ferrous metallurgical slags containing reducible compounds of said metals, said process comprising: establishing a reduction zone containing a matrix comprising pieces of a reducing material for said compounds, maintaining in said zone a reducing condition indicated by an atmosphere containing carbon monoxide and carbon dioxide in such proportions that log. $CO/CO_2$ is from $-4$ to $+2$, maintaining in said zone a temperature of between the melting point of the slag and 1450° C., passing the slag in the molten state through and in contact with the matrix in said zone for reduction of the reducible metal compounds present in the slag, withdrawing the treated molten slag from said zone after substantial reduction of said metal compounds has occurred, and separating the metal product from the withdrawn slag.

2. The process of claim 1 wherein the reducing material is carbon.

3. The process of claim 1 wherein the ratio of carbon monoxide to carbon dioxide in the reduction zone is expressed by the relationship log. $CO/CO_2 = -2$ to $+1$.

4. The process of claim 1 wherein the temperature in the reduction zone is maintained at a level of from 1100–1400° C.

5. The process of claim 1 wherein the ratio of carbon monoxide to carbon dioxide is expressed by the relationship log. $CO/CO_2 = -2$ to $+1$, and wherein the temperature in the reduction zone is maintained at a value of from 1100–1400° C.

6. The process of claim 1 wherein the matrix in the reduction zone comprises pieces of a reducing material in admixture with pieces of a slag-wettable packing material.

7. The process of claim 1 wherein the matrix in the reduction zone comprises pieces of a reducing material in admixture with pieces of a slag-wettable refractory oxide which is not reducible under the conditions of reaction present in said zone.

8. The process of claim 1 wherein the matrix in the reduction zone comprises pieces of a reducing material in admixture with pieces of slag-wettable siliceous compounds.

9. The process of claim 1 followed by the step of recycling the slag to the reduction zone for further reduction of its residual reducible metal compound content.

10. A process for recovering metals less active than ferrous iron in the electromotive series from non-ferrous metallurgical slags containing reducible compounds of said metals, said process comprising: establishing a reduction zone containing a matrix comprising pieces of a reducing material for said compounds, maintaining in said zone a reducing condition indicated by an atmosphere containing carbon monoxide and carbon dioxide in such proportions that log. $CO/CO_2$ is from $-4$ to $+2$, maintaining in said zone a temperature of between the melting point of the slag and 1450° C., passing the slag in the molten state through and in contact with the matrix in said zone for reduction of the reducible metal compounds present in the slag, withdrawing the treated molten slag from said zone after substantial reduction of said metal compounds to free metals has occurred, and mixing the treated slag with a quantity of untreated slag for reduction of its content of reducible metal compounds.

11. The process for recovering cobalt from non-ferrous metallurgical slags, containing reducible compounds of cobalt, said process comprising: establishing a reduction zone containing a matrix comprising pieces of carbon, maintaining in said zone a reducing condition indicated by an atmosphere containing carbon monoxide and carbon dioxide in such proportions that log. $CO/CO_2$ is from $-1$ to $+1.7$, maintaining in said zone a temperature of from 1100–1400° C., passing the slag in the molten state through and in contact with the matrix in said zone for reduction of the reducible cobalt compounds present in the slag, withdrawing the treated molten slag from said zone after substantial reduction of said cobalt compounds has occurred, and separating the cobalt product from the withdrawn slag.

12. The process for recovering copper from non-ferrous metallurgical slags, containing reducible compounds of copper, said process comprising: establishing a reduction zone containing a matrix comprising pieces of carbon, maintaining in said zone a reducing condition indicated by an atmosphere containing carbon monoxide and carbon dioxide in such proportions that log. $CO/CO_2$ is from $-3.3$ to $-1$, maintaining in said zone a temperature of from 1100–1400° C., passing the slag in the molten state through and in contact with the matrix in said zone for reduction of the reducible copper compounds present in the slag, withdrawing the treated molten slag from said zone after substantial reduction of said copper compounds has occurred, and separating the copper product from the withdrawn slag.

13. The process for recovering lead from non-ferrous metallurgical slags, containing reducible compounds of lead, said process comprising: establishing a reduction zone containing a matrix comprising pieces of carbon, maintaining in said zone a reducing condition indicated by an atmosphere containing carbon monoxide and carbon dioxide in such proportions that log. $CO/CO_2$ is from $-3.3$ to $-1$, maintaining in said zone a temperature of from 1050–1350° C., passing the slag in the molten state through and in contact with the matrix in said zone for reduction of the reducible lead compounds present in the slag, withdrawing the treated molten slag from said zone after substantial reduction of said lead compounds has occurred, and separating the lead product from the withdrawn slag.

14. The process for recovering nickel from non-ferrous metallurgical slags, containing reducible compounds of nickel, said process comprising: establishing a reduction zone containing a matrix comprising pieces of carbon, maintaining in said zone a reducing condition indicated by an atmosphere containing carbon monoxide and carbon dioxide in such proportions that log. $CO/CO_2$ is from $-2.3$ to $0$, maintaining in said zone a temperature of from 1100–1400° C., passing the the slag in the molten state through and in contact with the matrix in said zone for reduction of the reducible nickel compounds present in the slag, withdrawing the treated molten slag from said zone after substantial reduction of said nickel compounds has occurred, and separating the nickel product from the withdrawn slag.

15. The process for recovering tin from non-ferrous metallurgical slags, containing reducible compounds of tin, said process comprising: establishing a reduction zone containing a matrix comprising pieces of carbon, maintaining in said zone a reducing condition indicated by an atmosphere containing carbon monoxide and carbon dioxide in such proportions that log. $CO/CO_2$ is from $-1.0$ to $+1.7$, maintaining in said zone a temperature of from 1100–1400° C., passing the slag in the molten state through and in contact with the matrix in said zone for reduction of the reducible tin compounds present in the slag, withdrawing the treated molten slag from said zone after substantial reduction of said tin compounds has occurred, and separating the tin product from the withdrawn slag.

16. A process for recovering metals less active than ferrous iron in the electromotive series from non-ferrous metallurgical slags containing reducible compounds of said metals, said process comprising: establishing a vertically extending reduction zone containing a matrix comprising pieces of a reducing material for said compounds, maintaining in said zone a reducing condition indicated by an atmosphere containing carbon monoxide and carbon dioxide in such proportions that log. $CO/CO_2$ is from $-4$ to $+2$, maintaining in said zone a temperature of between the melting point of the slag and 1450° C., introducing the slag into the reduction zone adjacent the upper end of the latter whereby to permit the molten slag to flow downward through and in contact with said matrix in said zone for reduction of the reducible metal compounds present in the slag, withdrawing the treated molten slag from said zone after substantial reduction of said metal compounds has occurred, and separating the metal product from the withdrawn slag.

References Cited in the file of this patent

UNITED STATES PATENTS

| | | |
|---|---|---|
| 831,160 | Herman | Sept. 18, 1906 |
| 2,243,110 | Madaras | May 27, 1941 |
| 2,433,615 | Mahler | Dec. 30, 1947 |
| 2,473,795 | Hills et al. | June 21, 1949 |